United States Patent [19]
Want et al.

[11] Patent Number: 5,818,425
[45] Date of Patent: Oct. 6, 1998

[54] MAPPING DRAWINGS GENERATED ON SMALL MOBILE PEN BASED ELECTRONIC DEVICES ONTO LARGE DISPLAYS

[75] Inventors: Roy Want, Mountain View; Rich Gold, San Francisco, both of Calif.

[73] Assignee: Xerox Corporation, Stamford, Conn.

[21] Appl. No.: 626,861

[22] Filed: Apr. 3, 1996

[51] Int. Cl.$^6$ ..................................................... G09G 5/08
[52] U.S. Cl. ............................... 345/158; 345/2; 345/173
[58] Field of Search .............................. 345/2, 1, 3, 173, 345/179, 156, 158, 127, 128, 131, 121, 123, 141, 143, 145, 146

[56] References Cited

U.S. PATENT DOCUMENTS

| | | | |
|---|---|---|---|
| 5,146,049 | 9/1992 | Shima | 345/173 |
| 5,502,461 | 3/1996 | Okamoto | 345/173 |
| 5,561,446 | 10/1996 | Montlick | 345/173 |

OTHER PUBLICATIONS

S. Elrod et al., Liveboard: A Large Interactive Display Supporting Group Meetings, Presentations and Remote Collaboration, *Proc. Conf. on Comp. Human Interaction* (CHI), May 1992, pp. 599–607.

B. Schilit et al., Context–Aware Computing Applications, *Proc. Wkshp on Mobile Comp. Sys. and Apps.*, IEEE, Dec. 1994, pp. 85–90.

R. Want et al., A Focus on Context Sensitivity and the Spatial Arrangement of Computers and Overview of the Parctab Ubiquitous Computing Experiment, IEEE *Personal Communications*, Dec. 1995, pp. 28–43.

*Primary Examiner*—Xiao Wu
*Attorney, Agent, or Firm*—Robert A. Burtzlaff

[57] ABSTRACT

A user interface system for providing pen based input to large display screens includes a portable computer supporting both a wireless transmitter and a small pen input screen. A computer is connected to a large display screen having an area substantially larger than an area of the small pen input screen of the portable computer. A wireless receiver is connected to the computer and configured to receive wireless communications from the portable computer. An input mapping module is used for controlling user defined output on the large display screen in response to user defined input from the small pen input screen of the portable computer. The input mapping module has a selectable first mode for positioning graphical output to fall within a bounding box movable about the large display screen in response to pen movement on the small pen input screen. A second mode resizes a boundary box within which drawings are scaled and mapped onto the large display screen, while a third mode maps drawings on the pen input screen onto the large display screen. A fourth mode allows sequential character input to be automatically displayed on the large display screen.

6 Claims, 3 Drawing Sheets

MAPPING DRAWINGS GENERATED ON SMALL MOBILE PEN BASED ELECTRONIC DEVICES ONTO LARGE DISPLAYS

FIELD OF THE INVENTION

The present invention is an improved computer user interface system and method for interacting with pen based computers. More specifically, the present invention is a system and method for controlling large computer displays using a small pen based computer having a substantially smaller pen input display.

BACKGROUND AND SUMMARY OF THE INVENTION

Using computers for data input and display can be facilitated by the use of portable pen operated computers. These electronic devices, which may include personal digital assistants, notebook or subnotebook computers, or personal organizers, permit a user to conveniently generate data such as drawings and characters on small, handheld, portable electronic devices. While the generated data can be stored in memory or magnetic media for later retrieval and display by the pen operated computer, more typically the generated data is transferred by a communication link to a personal computer or workstation for later data manipulation and review. Advantageously, the greater memory, storage, and processing power of commonly available personal computers allows for greater ease of manipulation and integration of data generated on the pen operated computer into conventional word processing or graphics programs. This relative ease of data manipulation on conventional personal computers as compared to portable pen operated computers is also due in large part to the substantially larger viewing size of even relatively small CRT computer monitor displays. Accordingly, in practice raw data is generated on the convenient, portable pen operated computer, and transferred to a personal computer for refinement and integration with other data.

As will be appreciated, such commonly available data manipulation systems using pen operated computers have severe limitations. For example, multiple users wishing to transfer data generated on their pen operated computer between themselves (a situation that might arise, for example, in a small business meeting) are forced into a series of paired data transfers between each other until all possible pairwise data exchanges are exhausted. Alternatively, a computer workstation or personal computer must be found, all pen operated computer data transferred, and multiple windows, clipboards or other conventional personal computer software integration processes employed to collect, refine, and present the desired data.

To prevent such time consuming and awkward data exchanges, what is needed is a system that allows for integration of data provided by pen operated computers of multiple users to a large display. Such a system would allow multiple users to readily modify, annotate, or manipulate data displayed on a large screen. Such a system must allow a user of a pen operated computer to provide pen based input such as drawn characters, lines, or other indicia on the relatively small pen operated computer, and have such indicia mapped to a desired position on a large display.

Accordingly, the present invention is a user interface system for graphically displaying pen based input on large display screens. The system includes a portable computer supporting a wireless transmitter and a small pen input screen. A conventional personal computer, computer workstation, or the like is connected to a wireless receiver and a large display screen sized to have an area substantially larger than an area of the small pen input screen of the portable computer. The wireless receiver of the computer configured to receive wireless communications (typically infrared or radio) from the portable computer.

An input mapping module is used for generating a graphical display on the large display screen in response to user defined input from the small pen input screen of the portable computer. The input module can be software or hardware based, and can run on the large display connected computer or the portable computer (with calls to the large display connected computer being made through a remote procedure call or other conventional control mechanism). The input mapping module has a selectable first mode for positioning the graphical display to fall within a bounding box movable about the large display screen in response to pen movement on the small pen input screen, a selectable second mode for resizing the bounding box movable in response to pen movement on the small pen input screen, and a selectable third mode for drawing on the large display screen in response to pen movement on the small pen input screen. For simple character display, a selectable fourth mode can be used. In the fourth mode, user defined output characters (generated on the portable computer) are displayed in a first bounding box on the large display screen in response to pen movement on the small pen input screen, with input mapping module automatically positioning consecutive user defined output characters to fall within a second bounding box positioned adjacent to the first bounding box. Typically, a button or switch is used to toggle between graphical display modes, but of course pen activated display menus or other suitable selector can be employed.

Advantageously, the present invention allows for multiple users to interact with a large display board. For example, individual users equipped with a suitable pen based portable computer could move a bounding box to a position adjacent to text present on a large display. The user could then enter commentary, annotations, highlights, or visual indicia such as arrows to present the user's views on the displayed text to others. As will be appreciated, multiple users could also be entering their own commentary, promoting highly interactive communications between participant's in a meeting.

The present invention also encompasses a method for accepting pen input to generate suitable graphical displays on a large screen display. Advantageously, use of the described method simplifies the task of drawing on a large display screen using a device that may have an input area as much as 500 times smaller than the display area. Characters can be easily generated and sequentially displayed, and drawings, commentary, or annotations readily positioned, scaled, and displayed using the method of the present invention.

Additional functions, objects, advantages, and features of the present invention will become apparent from consideration of the following description and drawings of preferred embodiments.

DETAILED DESCRIPTION OF THE INVENTION

Figure 1:
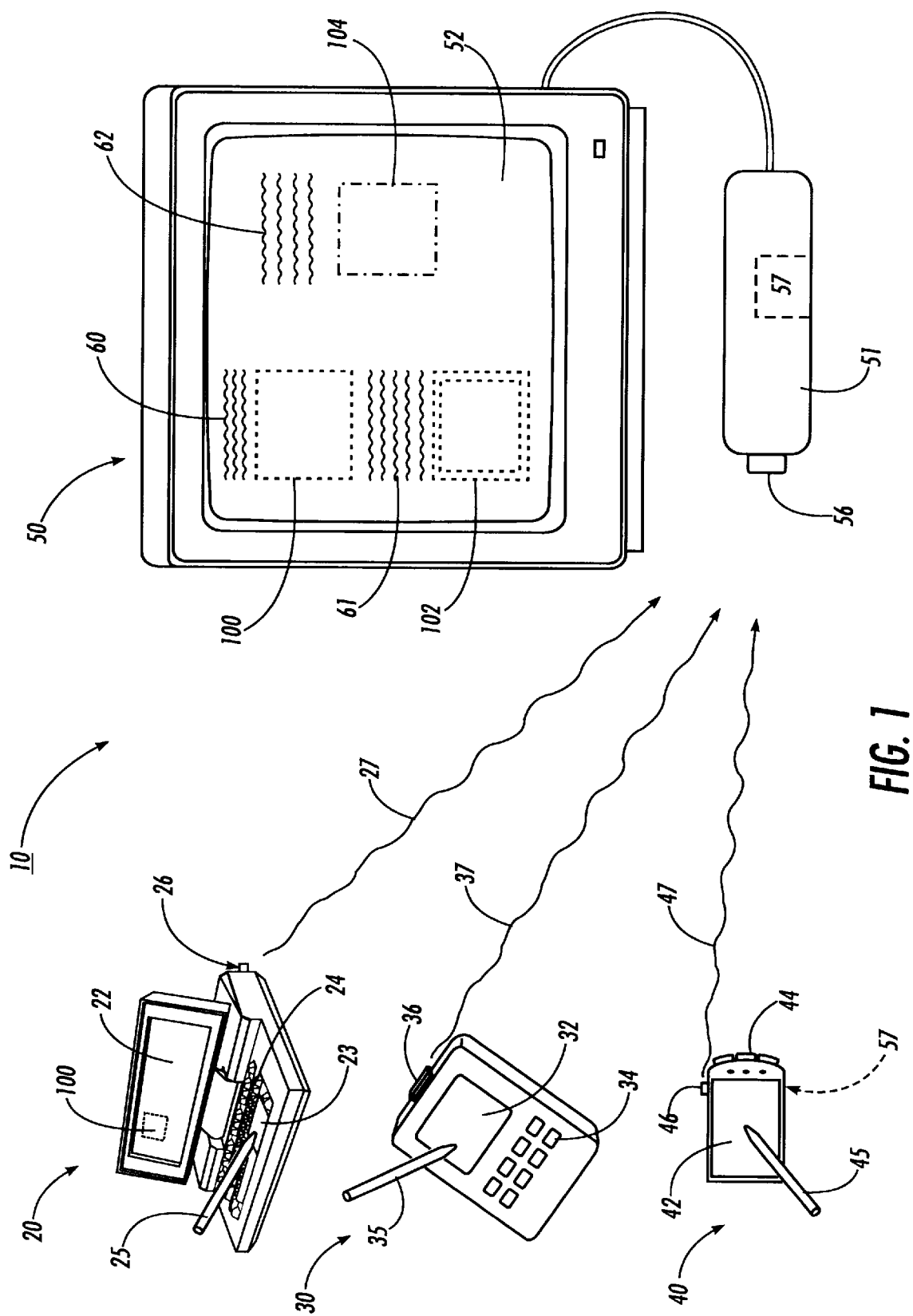
FIG. 1 is a schematic outline of computer having a large screen display, with input provided by several pen input portable computers through a wireless connection.

The present invention as illustrated schematically in FIG. 1 includes a user interface system 10 for graphically displaying pen based input on a large display screen 50. The system 10 supports a variety of portable input devices, including a notebook computer 20, a personal digital assistant 30, a small tablet computer 40, or any other electronic device capable of communicating with a computer 51 via a wireless transceiver link 56 to generate a display on the large display screen 50.

The portable notebook computer 20 includes a display screen 22, a small pen input screen 23 operated by a pen 25, and a plurality of input keys 24. Input from pen 25 can be used as a cursor control, and pen display output can be shown on the display screen 22 as well as on the large display screen 50. Communication is provided by a transceiver 26 that receives and transmits wireless signals 27. As will be appreciated, wireless communication can include infrared signals, radio signals, other optical signaling, or any other convenient signaling system.

Similarly, the personal digital assistant 30 is a portable pen based computer having a small pen input screen 32. In contrast to the notebook computer 20 with separate display screen 22 and pen input screen 23, the pen input screen 32 of the personal digital assistant 30 additionally functions as a display screen. Input is mediated by use of pen 35 and the plurality of input buttons or keys 34. Again, communication is provided by a transceiver 36 that receives and transmits wireless signals 37. Typically, the communication system and signaling protocols for the personal digital assistant 30 will be identical to that of the notebook computer, although of course in conjunction with suitable additional transceiver modules for computer 51 additional signal schemes can be supported.

The small tablet computer 40 also includes a pen input screen 42 used in conjunction with a pen 45, and a plurality of buttons 44 that provide an alternative mechanism for data or mode selection. Communication is provided by a transceiver 46 that receives and transmits wireless signals 47, with infrared signaling being preferred. A complete description of the user interface, signaling characteristics, and network computer connection protocols for a preferred tablet computer (the "ParcTab") is disclosed in an article titled "An overview of the ParcTab Ubiquitous Computing Experiment", Want et al., IEEE Personal Communications, pp. 28–43, December 1995, the disclosure of which is herein specifically incorporated by reference.

The foregoing portable computers are in wireless communication with the computer 51 using the wireless transceiver link 56. The computer 51 is in turn connected to control the display 50. As will be appreciated, the computer 51 can be a stand alone personal computer, a network connected workstation, a gateway computer connected to a network, a network server, or any suitable combination. The large screen display can range from a conventional 50 centimeter CRT monitor (20 inch diagonal screen size) to a several meter square sized projection screen system having an area a hundred to a thousand times the size of the pen input screen. In a preferred embodiment, a large pen sensitive display screen supporting conventional windowed, textual, and multimedia applications is used. Such a display screen/computer is known as a Liveboard, and is commercially available from Liveworks, Palo Alto, Calif. A description of the Liveboard, titled "Liveboard: A large interactive display supporting group meetings, presentations, and remote collaboration", Elrod et al., Proc. Conf. on Comp. Human Interaction (CHI), pp. 599–607, May 1992, is available, the disclosure of which is herein specifically incorporated by reference.

In operation, a user (not shown) of system 10 uses one of the portable computers 20, 30, or 40 to generate data such as characters, display control messages, or drawings. For best results, keys or buttons are use to select various drawing modes or environments in which pen actions are interpreted. Interpretation of button and pen actions is provided by software or hardware input modules 57 maintained on the portable computer or the computer 51 to map the pen or key input onto the screen 50. Typically, the input modules 57 are functionally distributed between the computer 51 and the portable computers, although other network computers can of course be used for processing input commands. Also, as will be appreciated, depending on the particular commands and requirements involved in the use of remote procedure calls, the location and distribution of input processing required can substantially vary between the portable computers, the computer 51 and the display 50.

Figure 2:
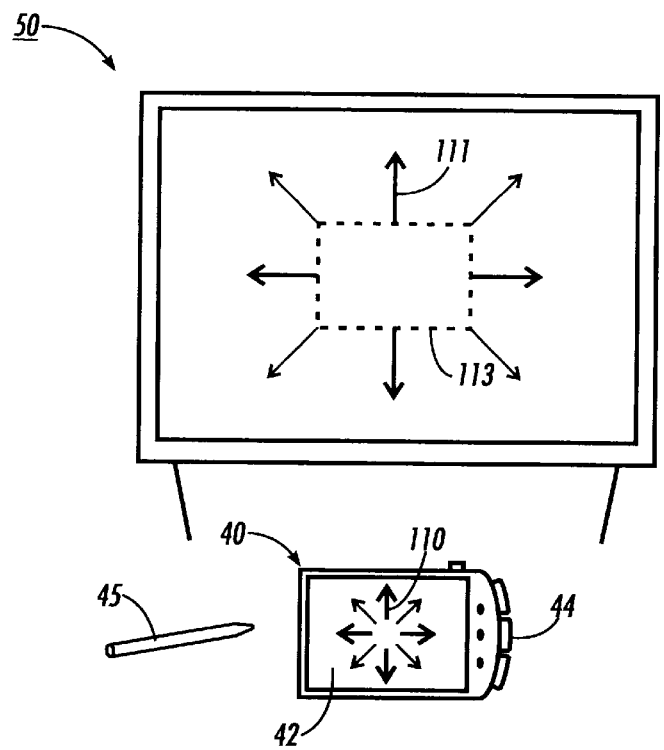
FIG. 2 illustrates a first mode for positioning the graphical display to fall within a bounding box movable about the large display screen in response to pen movement on the small pen input screen.

A selectable first mode of interaction between a tablet computer 40 and display screen 50 is illustrated in FIG. 2. The first mode is selected either by default or by positive user selection using input buttons 44 on the tablet computer 40. In the first mode, movement of the pen 45 on the pen input screen 42 in any direction (eg. up, down, left right, or diagonally, as represented by arrows 110) results in movement of a bounding box 113 in a corresponding direction (arrows 111) on the large display screen 50. The bounding box 113 can be represented on the screen 50 by dotted lines, and provides notice to a user as to the location and positioning on the screen 50 to which generated characters or drawings on the tablet computer 40 will be mapped.

Figure 3:
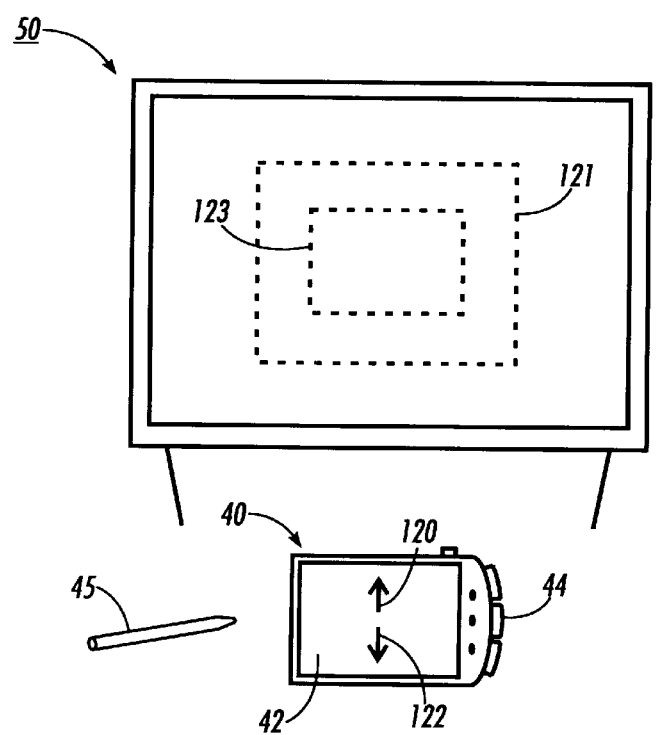
FIG. 3 illustrates a second mode for resizing the bounding box in response to vertical pen movement on the small pen input screen.

A selectable second mode of interaction between a tablet computer 40 and display screen 50 is illustrated in FIG. 3. The second mode is selected by positive user selection using input buttons 44 on the tablet computer 40. In the second mode, vertical movement of the pen 45 on the pen input screen 42 (up or down, as represented by arrows 120) results in resizing of a bounding box. For example, bounding box 123 can be increased to the size of bounding box 121 by making a vertical upstroke on tablet computer 40 with the pen 45. The displayed bounding box 121 or 123 again provides notice to a user as to the location and positioning on the screen 50 to which generated characters or drawings on the tablet computer 40 will be mapped, and additionally provides information as to the relative size of the character or drawing on the screen 50.

Figure 4:
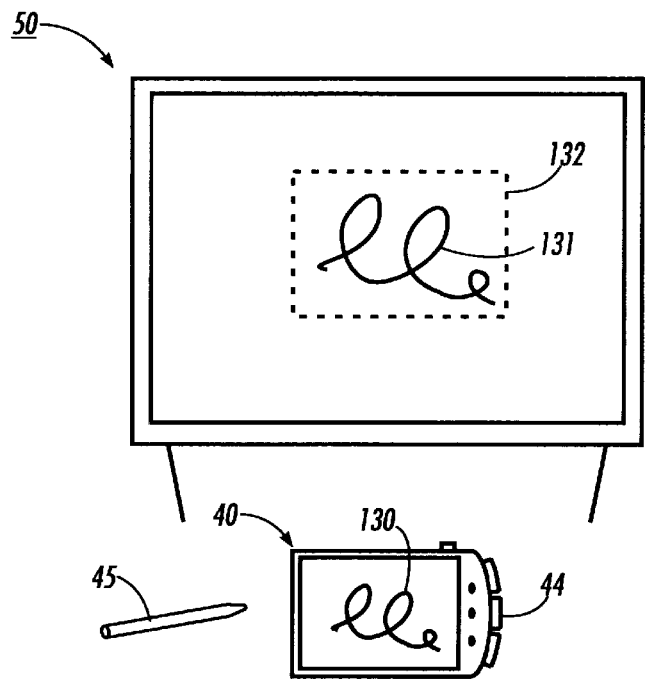
FIG. 4 illustrates a third mode for drawing on the large display screen in response to pen movement on the small pen input screen.

A selectable third mode of interaction between a tablet computer 40 and display screen 50 is illustrated in FIG. 4. The third mode is selected by positive user selection using input buttons 44 on the tablet computer 40. In the third mode, movement of the pen 45 on the pen input screen 42

(as represented by arrows 120) results in generation of the corresponding characters or drawings on the screen 50. The characters or drawings are positioned within a bounding box 132, which may be previously positioned and sized by a user operating in one of the selectable first or second modes. As will be appreciated, use of this mode conveniently allows for quick and simple annotation or markings on previously displayed text or characters on screen 50, and conveniently allows for multiple users to simultaneously mark and edit materials displayed on screen 50.

Figure 5:
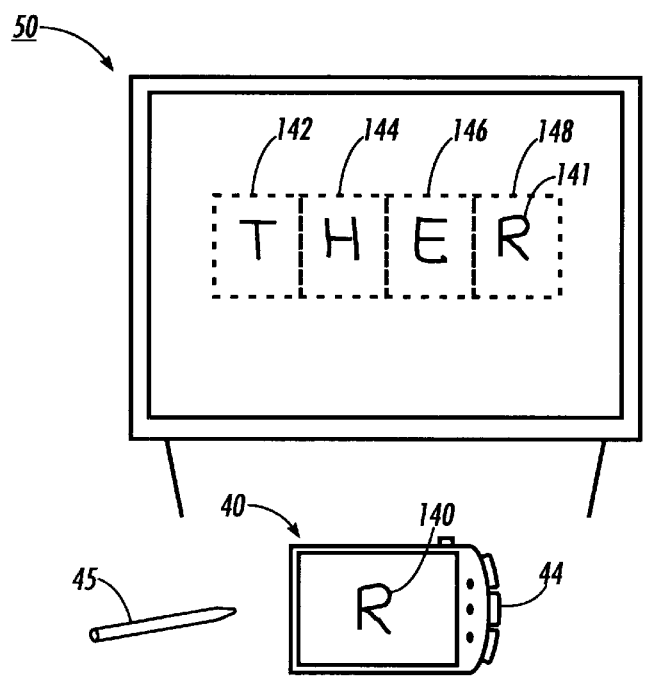
FIG. 5 illustrates a fourth mode for drawing user defined output characters in a first bounding box on the large display screen in response to pen movement on the small pen input screen, with automatic positioning of consecutive user defined output characters adjacent to the first bounding box shown.

A selectable fourth mode of interaction between a tablet computer 40 and display screen 50 is illustrated in FIG. 5. The fourth mode is selected by positive user selection using input buttons 44 on the tablet computer 40, and advantageously assists the process of text generation by automatically moving the bounding box to adjacent positions after character generation. For example, in the fourth mode movement of the pen 45 on the pen input screen 42 (as represented by character 140, "R") results in generation of the corresponding characters or drawings on the screen 50. After a character is entered, the bounding box is automatically moved to an adjacent position to await entry of another character. As can be seen by inspection of screen 50, the letter "T" was initially entered in the tablet computer 40 and displayed within the boundary box 142. After entry, the bounding box was automatically moved without additional user input to an adjacent position as seen by bounding box 144. The letter "H" was entered, and the process repeated, with the adjacent bounding box 146 created and filled with the generated character "E". As shown in FIG. 5, The letter "R" (character 141) has just been generated and mapped into the screen 50 within bounding box 148. As will be appreciated, use of this mode conveniently allows for quick and simple generation of substantially aligned text, without requiring user input to manually move the bounding box in between each character generation.

As an added advantage, the selectable fourth mode of interaction can facilitate generation of printed characters in applications utilizing handwriting recognition. For example, each character can be drawn on the pen based computer, displayed in the bounding box, and interpreted as a printed character for display. Various modifications of this basic handwriting recognition mode can of course be employed. As desired, a user can concurrently display both the cursive and the interpreted printed character, or alternatively can initially display a cursive character that is transformed within the bounding box into a printed character as handwriting recognition proceeds. Processing for handwriting recognition can proceed either on the portable computer or at computer 51.

To simplify handwriting recognition, the use of Unistroke characters is preferred. Unistroke characters are drawn with a single pen stroke, allowing lifting of the pen to substitute for button or other user input that signals completion of character generation. The use of Unistrokes is discussed with reference to small tablet computers in an article titled "An overview of the ParcTab Ubiquitous Computing Experiment", Want et al., IEEE Personal Communications, pp. 28–43, December 1995, the disclosure of which has previously been incorporated by reference. Further details relating to Unistrokes are disclosed in an article titled "Touch typing with a stylus", D. Goldberg and C. Richardson, Proc. Conf. On Human Factors in Comp. Sys. (INERCHI), ACM/SigCHI, April 1993, pp. 80–87, the disclosure of which is herein specifically incorporated by reference.

As those skilled in the art will appreciate, other various modifications, extensions, and changes to the foregoing disclosed embodiments of the present invention are contemplated to be within the scope and spirit of the invention as defined in the following claims.

What is claimed is:

1. A user interface system for graphically displaying pen based input from multiple users on large display screens, the system comprising multiple portable computers, with each portable computer supporting a wireless transmitter and a small pen input screen;

a computer supporting a wireless receiver and a large display screen sized to have an area substantially larger than an area of the small pen input screen of the portable computer, with the wireless receiver of the computer configured to receive wireless communications from the portable computer, and an input mapping module for generating multiple graphical displays on the large display screen in response to multiple user defined input from the small pen input screen of each of the multiple portable computers, with the input mapping module having a selectable mode for positioning the graphical display to fall within a bounding box movable about the large display screen in response to pen movement on the small pen input screen from each of the multiple portable computers, and wherein the input mapping module for generating a graphical display on the large display screen further comprises a selectable mode for drawing user defined output characters in a first bounding box on the large display screen in response to pen movement on the small pen input screen, with input mapping module automatically positioning consecutive user defined output characters to fall within a second bounding box positioned adjacent to the first bounding box.

2. A user interface system for graphically displaying pen based input from multiple users on large display screens, the system comprising multiple portable computers, with each portable computer supporting a wireless transmitter and a small pen input screen;

a computer supporting a wireless receiver and a large display screen sized to have an area substantially larger than an area of the small pen input screen of the portable computer, with the wireless receiver of the computer configured to receive wireless communications from the portable computer, and an input mapping module for generating multiple graphical displays on the large display screen in response to multiple user defined input from the small pen input screen of each of the multiple portable computers, with the input mapping module having a selectable first mode for positioning the graphical display to fall within a bounding box movable about the large display screen in response to pen movement on the small pen input screen from each of the multiple portable computers, a selectable second mode for resizing the bounding box to be movable in response to pen movement on the small pen input screen, a selectable third mode for drawing on the large display screen in response to pen movement on the small pen input screen, and a selectable fourth mode for drawing user defined output characters in a first bounding box on the large display screen in response to pen movement on the small pen input screen, with input mapping module automatically positioning consecutive user defined output characters to fall within a second bounding box positioned adjacent to the first bounding box.

3. The user interface system of claim 2, further comprising at least one depressable button for selecting one of the selectable first, second, third, and fourth modes.

4. A method for graphically displaying pen based input on large display screens, the method comprising the steps of providing a portable computer that supports a wireless transmitter and a small pen input screen;

establishing communication between the portable computer and a computer supporting both a wireless receiver and a large display screen sized to have an area substantially larger than an area of the small pen input screen of the portable computer, and drawing user defined output characters in a first bounding box on the large display screen in response to pen movement on the small pen input screen, with input mapping module automatically positioning consecutive user defined output characters to fall within a second bounding box positioned adjacent to the first bounding box.

5. The method of claim 4, further comprising the step of selecting a second mode for resizing the bounding box in response to pen movement on the small pen input screen.

6. A user interface system for graphically displaying pen based input from a pen based portable computer on large display screens, the system comprising a small pen input screen, a large display screen sized to have an area substantially larger than an area of the small pen input screen, an input mapping module for generating a graphical display on the large display screen in response to input from the small pen input screen, with the input mapping module having a selectable mode for positioning the graphical display to fall within a first bounding box movable about the large display screen in response to pen movement on the small pen input screen, and wherein the input mapping module automatically positions consecutive user defined output characters to fall within a second bounding box positioned adjacent to the first bounding box.

* * * * *